(12) United States Patent
Kodera et al.

(10) Patent No.: US 7,086,882 B2
(45) Date of Patent: Aug. 8, 2006

(54) CARD CONNECTOR HAVING A RETARDING MECHANISM FOR RETARDING AN EJECTING OPERATION OF A CARD

(75) Inventors: Masafumi Kodera, Tokyo (JP); Joe Motojima, Tokyo (JP); Akira Natori, Tokyo (JP); Keiichiro Suzuki, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 11/146,770

(22) Filed: Jun. 7, 2005

(65) Prior Publication Data
US 2005/0277319 A1 Dec. 15, 2005

(30) Foreign Application Priority Data
Jun. 9, 2004 (JP) .............................. 2004-171271

(51) Int. Cl.
*H01R 13/62* (2006.01)
(52) U.S. Cl. ..................................... 439/159
(58) Field of Classification Search ................. 439/159
See application file for complete search history.

(56) References Cited

U.S. PATENT DOCUMENTS 6,503,092 B1 * 1/2003 Sato ............................ 439/159
6,655,972 B1 * 12/2003 Sato ............................ 439/159
6,955,547 B1 * 10/2005 Chou .......................... 439/159

FOREIGN PATENT DOCUMENTS

| JP | 6-162281 A | 6/1994 |
| JP | 8236205 | * 9/1996 |
| JP | 2001-267013 A | 9/2001 |

* cited by examiner

*Primary Examiner*—Truc Nguyen
(74) *Attorney, Agent, or Firm*—Frishauf, Holtz, Goodman & Chick, P.C.

(57) ABSTRACT

In a card connector for use in connecting a card, an eject mechanism is coupled to a housing for receiving the card. The eject mechanism is for executing an ejecting operation of ejecting the card from the housing. The card connector is provided with a retarding mechanism which cooperates with the eject mechanism to retard the ejecting operation. The retarding mechanism may include a braking mechanism for braking the card in response to an operation of the eject mechanism. Alternatively, the braking mechanism may be for braking an eject bar which is included in the eject mechanism and movable along the housing for ejecting the card.

9 Claims, 6 Drawing Sheets

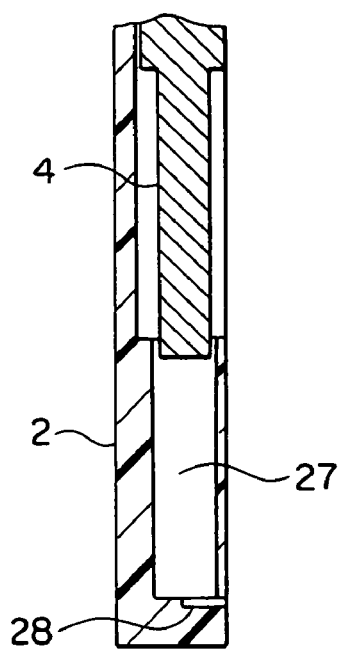
FIG. 7
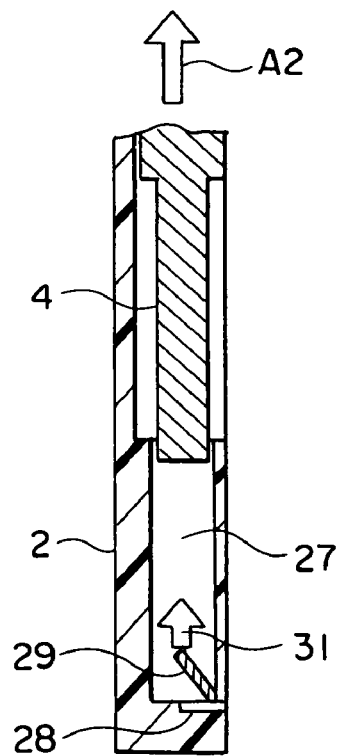 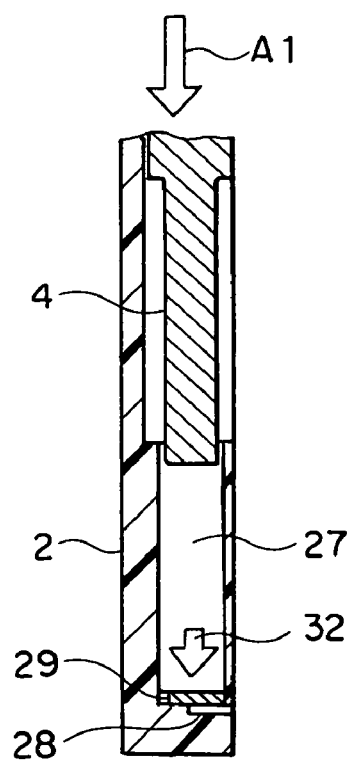
FIG. 8A    FIG. 8B

CARD CONNECTOR HAVING A RETARDING MECHANISM FOR RETARDING AN EJECTING OPERATION OF A CARD

This application claims priority to prior Japanese patent application JP 2004-171271, the disclosure of which is incorporated herein by reference.

BACKGROUND OF THE INVENTION

The present invention relates to a card connector for use in connecting a card and, in particular, to a card connector capable of preventing a card from jumping out when the card is ejected.

Japanese Unexamined Patent Application Publication (JP-A) No. 2001-267013 discloses a card connector of a push-push type. The card connector comprises an insulator, a plurality of contacts fixed to the insulator, an eject bar mounted to a frame portion of the insulator, a compression coil spring continuously urging the eject bar in an ejecting direction, and a cam follower guided by a heart cam formed on the eject bar.

A card is inserted into the connector and ejected from the connector. When the compression coil spring pushes the eject bar upon ejecting the card, the card may undesirably jump out. In this event, the card is dropped and, in the worst case, damaged.

Japanese Unexamined Patent Application Publication (JP-A) No. H6-162281 discloses a connecting structure of an IC card to an external equipment. When the IC card is inserted into the external equipment, the IC card is placed on a sliding plate. The sliding plate is urged by a spring in an ejecting direction. In order to eject the IC card from the external equipment, a push button is pushed. Then, the IC card is released from a connector. The IC card and the sliding plates are ejected from the external equipment under an urging force of the spring.

The external equipment adapted to receive the IC card which is inserted therein and ejected therefrom is provided with a braking portion formed adjacent to a card slot at a position under the card slot. The braking portion is formed by a flat rubber plate of synthetic rubber or natural rubber and is fixedly attached by an adhesive. When the sliding plate is ejected from the external equipment, the sliding plate is contacted with the braking portion so that frictional resistance is produced. Therefore, the sliding plate is slowly ejected from the external equipment and the IC card is prevented from jumping out from the external equipment. With the above-mentioned structure, however, the frictional resistance between the sliding plate and the braking portion is unstable and weak.

SUMMARY OF THE INVENTION

It is therefore an object of the present invention to provide a card connector which is capable of reliably preventing a card from jumping out when the card is ejected.

It is another object of the present invention to provide a card connector of the type described, which has a retarding mechanism for retarding an ejecting operation of the card.

Other objects of the present invention will become clear as the description proceeds.

According to an aspect of the present invention, there is provided a card connector for use in connecting a card, the card connector comprising a housing for receiving the card, an eject mechanism coupled to the housing for executing an ejecting operation of ejecting the card from the housing, and a retarding mechanism cooperating with the eject mechanism to retard the ejecting operation.

BRIEF DESCRIPTION OF THE DRAWING

FIG. 7 is a sectional view taken along a line VII—VII in FIG. 6;

FIG. 8A is a sectional view of a modification of the card connector of FIG. 6 when the card is inserted therein; and FIG. 8B is a sectional view similar to FIG. 8A when the card is ejected therefrom.

DESCRIPTION OF THE PREFERRED EMBODIMENT

Figure 1:
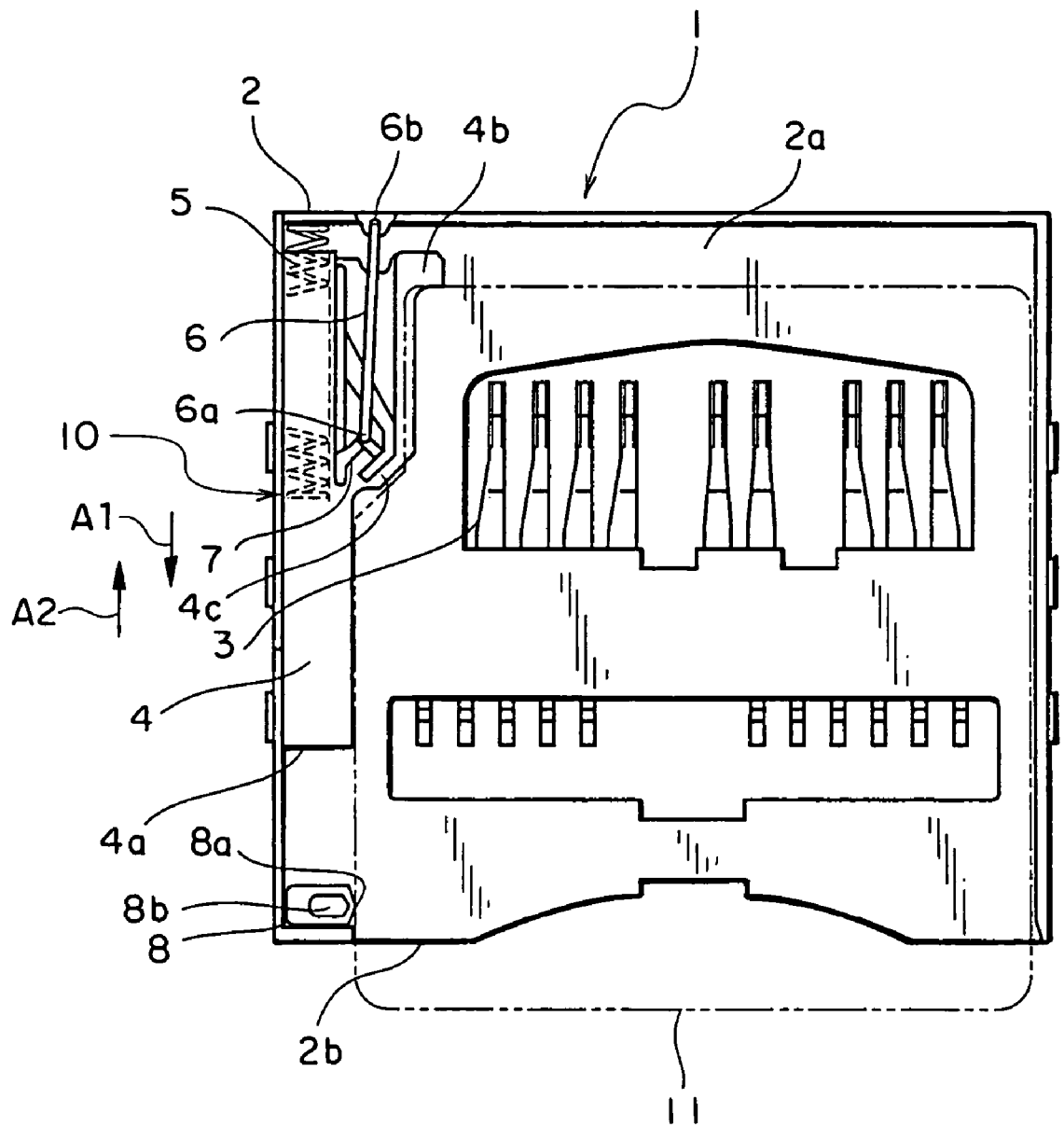
FIG. 1 is a front view of a card connector according to a first embodiment of this invention when a card is inserted therein.
Figure 2:
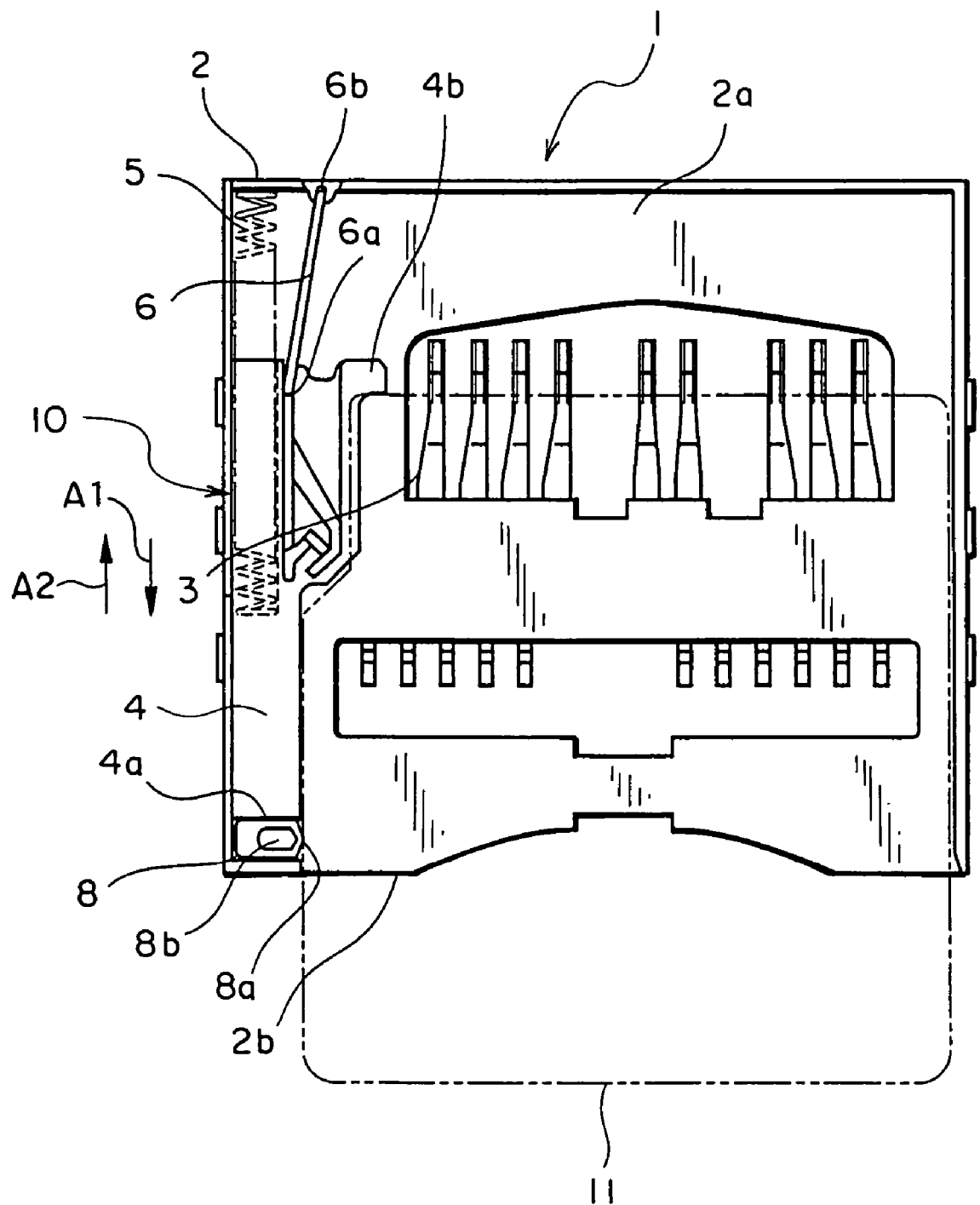
FIG. 2 is a front view of the card connector in FIG. 1 during ejection of the card.
Figure 3:
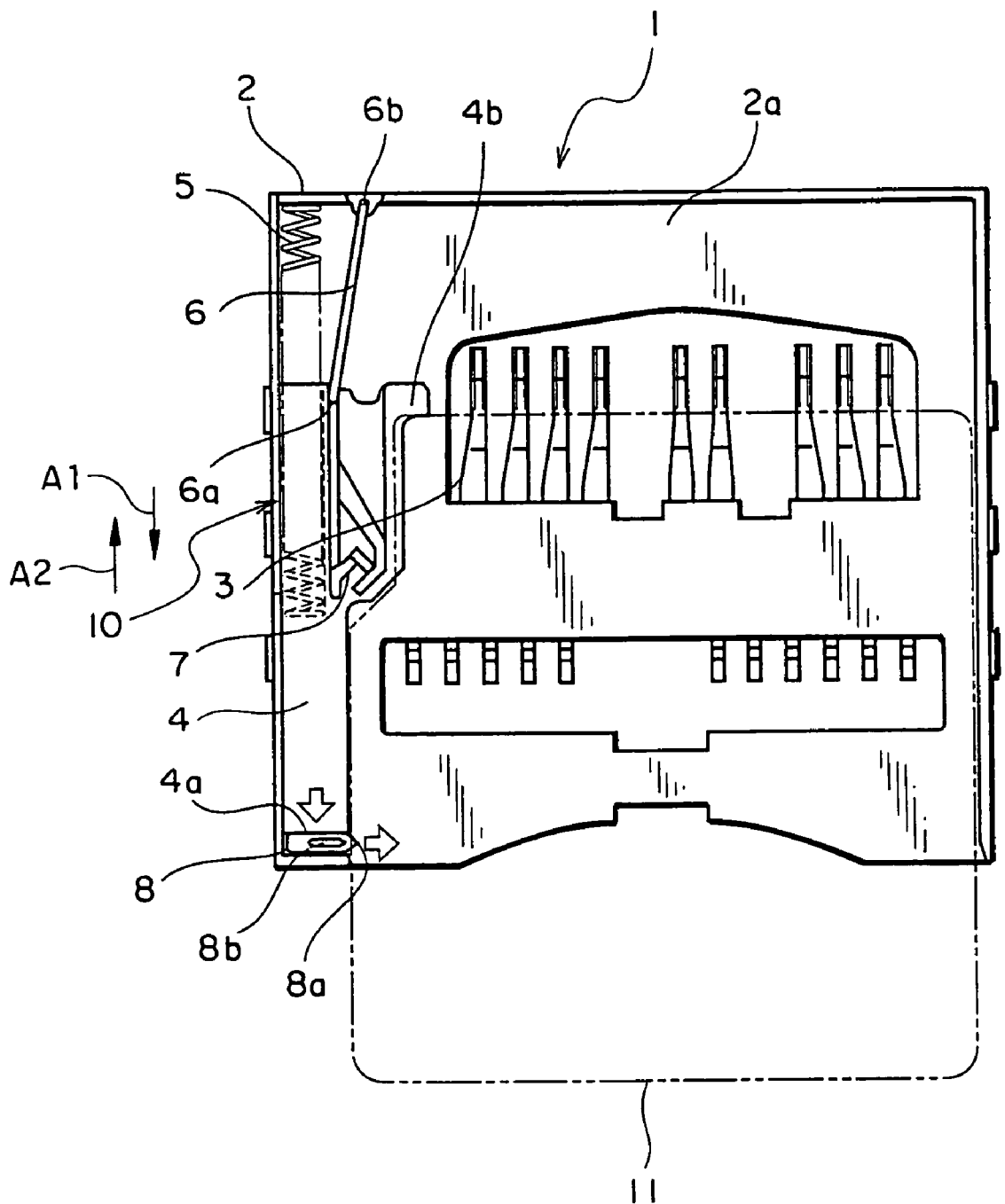
FIG. 3 is front view of the card connector in FIG. 1 after the card is ejected therefrom.

Referring to FIGS. 1 to 3, a card connector according to a first embodiment of the present invention will be described.

The card connector depicted at 1 in FIGS. 1 through 3 comprises an insulating housing 2 made of synthetic resin, a plurality of conductive contacts 3 fixed to the housing 2, an eject bar 4 made of synthetic resin and attached to a frame portion of the housing 2, a compression coil spring 5 continuously urging the eject bar 4 in an ejecting direction A1, and a cam follower 6 having a first end 6a which is guided by a heart cam 7 formed on the eject bar 4. A combination of the eject bar 4, the compression coil spring 5, the cam follower 6, and a heart cam 7 is referred to as an eject mechanism 10.

The contacts 3 are arranged in a single row and held inside the housing 2 of the card connector 1 in an area near the center of an inner portion 2a of the housing 2. The eject bar 4 is held inside the housing 2 on a left side thereof to be slidable in a vertical direction in the figures. More particularly, the eject bar 4 is contained in the housing 2 to be movable in the ejecting direction A1 and an inserting direction A2 opposite to the ejecting direction A1. The compression coil spring 5 continuously urges the eject bar 4 towards an inlet portion 2b of the housing 2, i.e., in the ejecting direction A1. Specifically, the compression coil spring 5 has one end and the other end kept in press contact with the eject bar 4 and an inner surface of the frame portion of the housing 2, respectively.

The cam follower 6 is made of a metal material and has a second end 6b which is engaged with an axial hole formed on the frame portion of the housing 2 and which is rotatable by a predetermined angle. The first end 6a of the cam follower 6 is engaged with a groove of the heart cam 7.

A card 11 is inserted into the connector 1 in the inserting direction A2 and ejected from the connector 1 in the ejecting direction A1. The eject bar 4 has a protruding portion 4b. When the card 11 is inserted into the connector 1, one corner of a forward end of the card 11 is brought into contact with the protruding portion 4b. Further, the housing 2 is provided with a rubber brake 8 fixed thereto on a left side of the inlet portion 2b. The rubber brake 8 is made of an elastically deformable rubber material known in the art.

Figure 4:
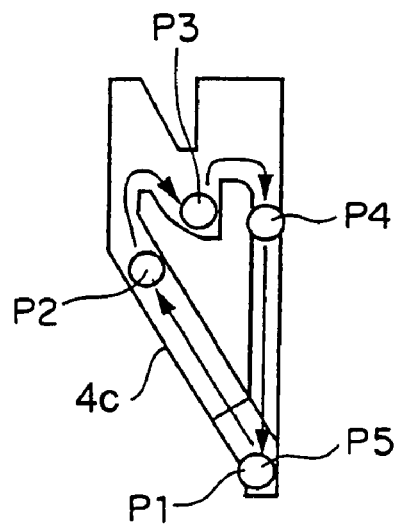
FIG. 4 is a view for describing a shape of a heart cam included in the card connector in FIG. 1.
Figure 5:
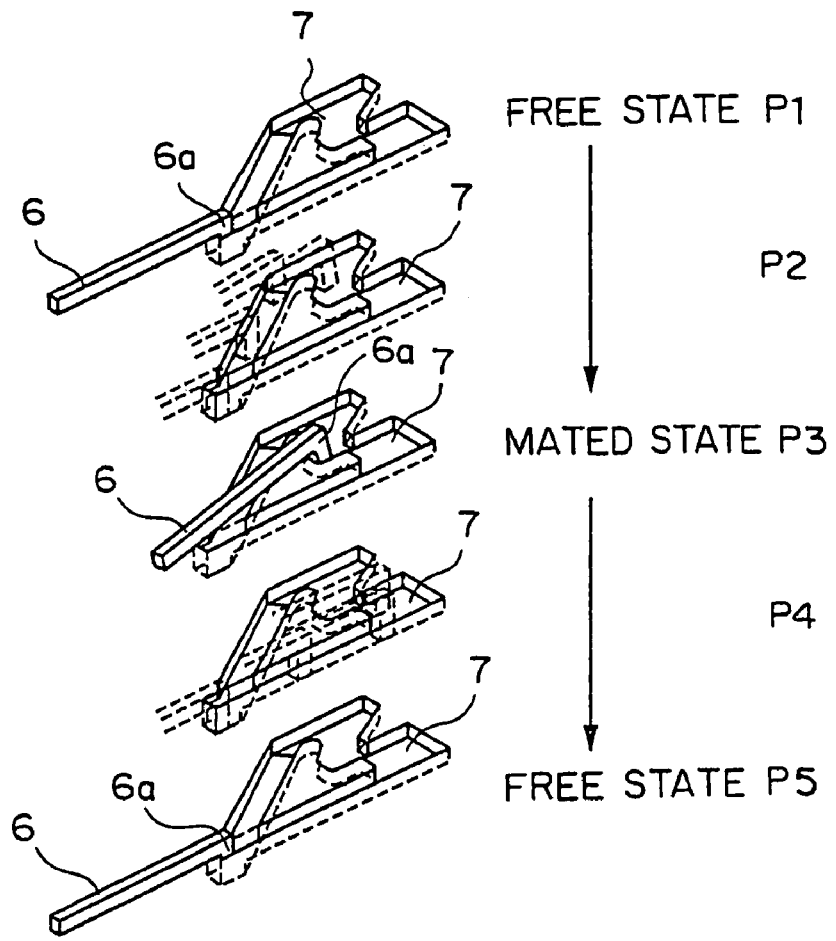
FIG. 5 is a view for describing an operation of the heart cam of FIG. 4.

Referring to FIGS. 4 and 5, the heart cam 7 will briefly be described. The heart cam 7 is formed on a protruding portion 4c of the eject bar 4. The heart cam 7 is formed as an annular guide rail or a cam groove having a first point P1, a second point P2, a third point P3, a fourth point P4, and a fifth point P5. The first point P1 is a start point of movement of the first end 6a of the cam follower 6. The second point P2 is located in a guide portion slightly inclined with respect to the ejecting and the inserting directions A1 and A2. The third point P3 is located in a heart-like recessed portion. The fourth point P4 is located in a guide portion substantially parallel to the ejecting and the inserting directions A1 and A2. The fifth point P5 is an end point of the movement of the first end 6a of the cam follower 6. The fifth point P5 is identical with the first point P1. In a free state of the connector 1, the first end 6a of the cam follower 6 is urged rightward in FIG. 4 by elasticity of the cam follower 6.

Following sliding movement of the eject bar 4, the first end 6a of the cam follower 6 moves along the heart cam 7 in the order of the first point P1, the second point P2, the third point P3, the fourth point P4, and the fifth point P5. Depending upon a position of the first end 6a of the cam follower 6, the connector 1 is changed from the free state into a mating state and vice versa, as illustrated in FIG. 5.

Turning back to FIGS. 1 to 3, description will be made of insertion and ejection of the connector 1 into and from the card 11.

When the card 11 is inserted into the housing 2 by operator's fingers, the one corner of the forward end of the card 11 pushes the protruding portion 4b of the eject bar 4. Consequently, the eject bar 4 presses the coil spring 5 and slides in the inserting direction A2 from the inlet portion 2b towards the inner portion 2a. Upon completion of insertion of the card 11, a plurality of contact points (not shown) of the card 11 are connected to the contacts 3 of the card connector 1. At this time, an operation or movement of the eject bar 4 is restricted by the cam follower 6.

In order to eject the card 11 from the housing 2, a push button (not shown) formed on the housing 2 or the card 11 itself is pushed. Then, the eject bar 4 is unlocked from the cam follower 6 and slides in the ejecting direction A1 from the inner portion 2a towards the inlet portion 2b under restoring force of the coil spring 5 to reach a state illustrated in FIG. 2. At this time, the protruding portion 4b of the eject bar 4 pushes the forward end of the card 11. Consequently, the card 11 reaches the state illustrated in FIG. 2 together with the eject bar 4. In this state, one end 4a of the eject bar 4 starts to compress the rubber brake 8 in a compressing direction, namely, the ejecting and the inserting directions A1 and A2. Subsequently, as illustrated in FIG. 3, the rubber brake 8 is elastically deformed in a direction perpendicular to the compressing direction so that a butting portion 8a at an end of a triangular part of the rubber brake 8 is brought into press contact with one side of the card 11. As a result, the card 11 is braked by friction between the card 11 and the rubber brake 8. In other words, the rubber brake 8 makes the card 11 be slowed in an ejecting operation thereof. Therefore, the card 11 is prevented from undesirably jumping out from the housing 2. At this time, the rubber brake 8 serves as a braking mechanism for braking the card 11 or a retarding mechanism for retarding ejection of the card 11.

Preferably, the rubber brake 8 is provided with a hollow portion 8b. In this event, the rubber brake 8 is easily elastically deformed. At this time, the hollow portion 8b serves as an auxiliary mechanism for effectively causing elastic deformation of the rubber brake 8.

Figure 6:
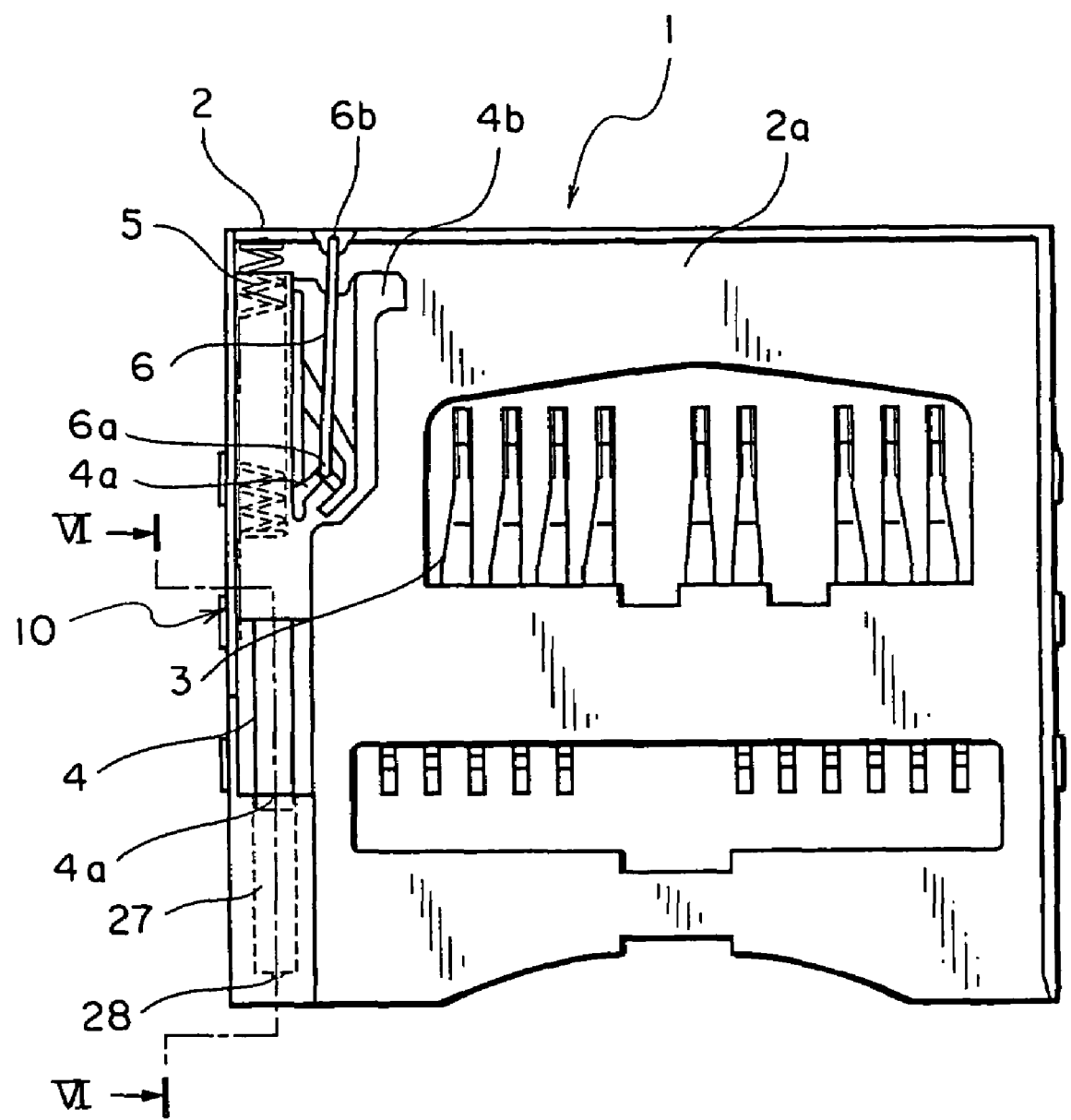
FIG. 6 is a front view of a card connector according to a second embodiment of this invention when a card is inserted therein although not shown in the figure.

Referring to FIGS. 6 and 7, description will be made of a card connector according to a second embodiment of this invention. Similar parts are designated by like reference numerals and description thereof will be omitted.

The card connector 1 uses an air spring instead of the rubber brake 8 in the card connector illustrated in FIGS. 1 through 3. The air spring has a cylindrical portion 27 formed in the housing 2. The cylindrical portion 27 is provided with an air-relief hole 28. The air-relief hole 28 allows an inner space of the cylindrical portion 27 to communicate through a rear surface of the housing 2 with an outside. A part of the eject bar 4 is inserted into the cylindrical portion 27.

The air-relief hole 28 has a sectional area extremely narrower than that of the cylindrical portion 27. With this structure, when the card is ejected from the card connector 1, air does not easily flow out from the cylindrical portion 27 through the air-relief hole 28 to the outside. Consequently, the eject bar 4 slides slowly. This means that a combination of the cylindrical portion 27 and the air-relief hole 28 serves to make the eject bar 4 be slowed in movement thereof in the ejecting direction A1. Accordingly, the card is prevented from undesirably jumping out from the housing 2. At this time, a combination of the cylindrical portion 27 and the air-relief hole 28 serves as a braking mechanism for braking the eject bar 4 or a retarding mechanism for retarding ejection of the card.

As shown in FIGS. 8A and 8B, an air valve 29 may be provided to open and close the air-relief hole 28. In this case, the air valve 29 is made of an elastically deformable material.

When the card is inserted, the eject bar 4 is pushed by the card and moved in the inserting direction A2 of FIG. 8A. In this event, the air valve 29 opens the air-relief hole 28 as depicted by a lower white arrow 31 in FIG. 8A so that air flows through the air-relief hole 28 into the cylindrical portion 27.

When operation is carried out to eject the card in the manner known in the art, the eject bar 4 slides in the ejecting direction A1 of FIG. 8B. In this event, air moves in the cylindrical portion 27 towards the air-relief hole 28 to make the air valve 29 be faced to the air-relief hole 28 as depicted by a lower white allow 32 in FIG. 8B. As a consequence, the air is compressed in the cylindrical portion 27 in the ejecting and the inserting directions A1 and A2.

Although the air valve 29 faces the air-relief hole 28, the air is allowed to flow by little and little through the air-relief hole 28. For example, a small gap is formed between the air valve 29 and the air-relief hole 28 or the air valve 29 is provided with a small hole or holes. Therefore, the eject bar 4 slides slowly and the card is prevented from undesirably jumping out from the housing 2.

While the present invention has thus far been described in connection with the preferred embodiments thereof, it will readily be possible for those skilled in the art to put this invention into practice in various other manners. For example, a plurality of contacts are provided in each of the foregoing embodiments. However, this invention is also applicable to the case where only one contact is provided.

What is claimed is:
1. A card connector comprising:
   a housing for receiving a card;
   an eject mechanism coupled to the housing for executing an ejecting operation of ejecting the card from the housing; and a retarding mechanism cooperating with the eject mechanism to retard the ejecting operation;

wherein the eject mechanism comprises an eject bar movable along the housing for ejecting the card;

wherein the retarding mechanism comprises a braking mechanism which brakes the card in response to an operation of the eject mechanism and which comprises an elastic member that is elastically deformed by the eject bar to be frictionally engaged with the card when the card is ejected; and wherein the elastic member has a hollow portion formed therein to facilitate the elastic deformation of the elastic member.

2. The card connector according to claim 1, wherein the elastic member is fixed to the housing and faced to the eject bar.

3. The card connector according to claim 1, wherein the eject mechanism further comprises a spring which urges the eject bar in one direction.

4. The card connector according to claim 1, further comprising a conductive contact coupled to the housing and adapted to be electrically connected to the card.

5. A card connector comprising:

a housing for receiving a card;

an eject mechanism coupled to the housing for executing an ejecting operation of ejecting the card from the housing; and a retarding mechanism cooperating with the eject mechanism to retard the ejecting operation;

wherein the eject mechanism comprises an eject bar movable along the housing for ejecting the card;

wherein the retarding mechanism comprises a braking mechanism which brakes the eject bar and which comprises an air spring coupled to the eject bar;

wherein the air spring comprises a cylindrical portion coupled to the housing and an air-relief portion communicating with the cylindrical portion, and a part of the eject bar is inserted into the cylindrical portion.

6. The card connector according to claim 5, wherein the air-relief portion has a sectional area narrower than a sectional area of the cylindrical portion.

7. The card connector according to claim 5, wherein the air spring further comprises an air valve for opening and closing the air-relief portion.

8. The card connector according to claim 5, wherein the eject mechanism comprises a spring which urges the eject bar in one direction.

9. The card connector according to claim 5, further comprising a conductive contact coupled to the housing and adapted to be electrically connected to the card.

* * * * *